US008272948B2

(12) United States Patent
Velu et al.

(10) Patent No.: US 8,272,948 B2
(45) Date of Patent: Sep. 25, 2012

(54) WAGERING GAME MACHINES AND METHODS FOR PRINTING INFORMATION IN A SELF-ERASING FORMAT

(75) Inventors: Muthu Velu, Addison, IL (US); Mark B. Gagner, West Chicago, IL (US)

(73) Assignee: WMS Gaming Inc, Waukegan, IL (US)

( * ) Notice: Subject to any disclaimer, the term of this patent is extended or adjusted under 35 U.S.C. 154(b) by 377 days.

(21) Appl. No.: 12/531,381

(22) PCT Filed: Feb. 14, 2008

(86) PCT No.: PCT/US2008/001985
§ 371 (c)(1), (2), (4) Date: Sep. 15, 2009

(87) PCT Pub. No.: WO2008/115327
PCT Pub. Date: Sep. 25, 2008

(65) Prior Publication Data

US 2010/0069145 A1 Mar. 18, 2010

Related U.S. Application Data

(60) Provisional application No. 60/895,295, filed on Mar. 16, 2007.

(51) Int. Cl.
*G06F 17/00* (2006.01)
*G06F 19/00* (2011.01)

(52) U.S. Cl. ............................... 463/25; 463/16; 463/20

(58) Field of Classification Search ............ 463/116–20, 463/25, 29–31, 40–42
See application file for complete search history.

(56) References Cited

U.S. PATENT DOCUMENTS 4,032,946 A * 6/1977 Wakatsuki et al. ............. 463/25
5,777,903 A 7/1998 Piosenka et al.
6,017,661 A * 1/2000 Lindsay et al. ................. 430/19
6,127,073 A * 10/2000 Nohr et al. ....................... 430/19
6,200,216 B1 * 3/2001 Peppel .............................. 463/1
6,498,655 B1 * 12/2002 Brooks et al. ................ 358/1.12
7,134,962 B2 * 11/2006 Meyerhofer et al. ........... 463/47
7,851,409 B1 * 12/2010 Xu ................................ 503/201
2001/0040341 A1 11/2001 Kamille
2002/0077983 A1 * 6/2002 Tagashira ........................ 705/50
2002/0093136 A1 * 7/2002 Moody ......................... 273/139

(Continued)

OTHER PUBLICATIONS

"International Application Serial No. PCT/US2008/001985, International Search Report and Written Opinion mailed Aug. 27, 2008", 14 pgs.

Gaudin, S., "Xerox invents self-erasing, re-usable paper", *EE Times*, http://www.eetimes.com/news/latest/showArticle.jhtml;jsessionid=CBIIY12YH4ADIQSNDLSCKHA?articleID=196513603, (2006).

(Continued)

*Primary Examiner* — Milap Shah

(74) *Attorney, Agent, or Firm* — Schwegman Lundberg & Woessner, P.A.

(57) ABSTRACT

Apparatus, systems, and methods may operate to receive information associated with a wagering game machine capable of engaging in the process of presenting a wagering game upon which monetary value may be wagered, print a first portion of the information in human perceivable form on a tangible object, such as a wagering game machine ticket, and record a second portion of the information in a wireless memory device to be attached to the wagering game machine ticket. Other apparatus, systems, and methods are disclosed.

17 Claims, 8 Drawing Sheets

U.S. PATENT DOCUMENTS

| | | | |
|---|---|---|---|
| 2004/0132529 | A1* | 7/2004 | Mkrtchyan et al. ............. 463/29 |
| 2004/0229677 | A1 | 11/2004 | Gray et al. |
| 2005/0096127 | A1 | 5/2005 | Dabrowski |
| 2006/0105829 | A1 | 5/2006 | Vancura |
| 2006/0205519 | A1 | 9/2006 | Soltys |
| 2006/0212813 | A1 | 9/2006 | Yalovsky et al. |
| 2006/0222972 | A1 | 10/2006 | Chopra et al. |
| 2007/0032286 | A1 | 2/2007 | Muir |

OTHER PUBLICATIONS

Genuth, I., "Xerox Inkless Printer", http://www.tfot.info/content/view/115/58/, (2007).

Kessler, Michelle, "Computer chips find homes on everyday items", *USA Today*, http://www.usatoday.com/tech/news/techinnovations/2006-07-17-chips-everywhere_x.htm, (Jul. 17, 2006).

* cited by examiner

WAGERING GAME MACHINES AND METHODS FOR PRINTING INFORMATION IN A SELF-ERASING FORMAT

RELATED APPLICATION

This patent application is a U.S. National Stage Filing under 35 U.S.C. 371 from International Patent Application Serial No. PCT/US2008/001985, filed Feb. 14, 2008, and published on Sep. 25, 2008, as WO 2008/115327 A2 and republished as WO 2008/115327 A3, which claims the priority benefit of U.S. Provisional Patent Application Ser. No. 60/895,295 filed Mar. 16, 2007 and entitled "WAGERING GAME MACHINE INFORMATION EXCHANGE", the contents of which are incorporated herein by reference in their entirety.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2007, 2008 WMS Gaming, Inc.

FIELD

Embodiments of the inventive subject matter relate generally to wagering game systems, and more particularly, to information exchange with wagering game machines.

BACKGROUND

Wagering game machine makers strive to provide new and entertaining games. One way of increasing the entertainment value associated with casino-style wagering games (e.g., video slots, video poker, video black jack, and the like) includes offering a variety of base games and bonus events. However, despite the variety of base games and bonus events, players sometimes lose interest in repetitive wagering gaming content. Thus, there is a need for apparatus, systems, and methods that serve to increase the entertainment value associated with wagering game machines.

BRIEF DESCRIPTION OF THE FIGURES

Embodiments of the invention are illustrated by way of example and not limitation in the Figures of the accompanying drawings in which.

DESCRIPTION OF THE EMBODIMENTS

Example Operating Environment

Example Wagering Game Machine Architecture

In various embodiments, the entertainment value associated with wagering game machines may be increased by introducing time as a factor in the exchange of game-related information. For example, information regarding bonuses and other awards can be delivered to the player in a way that lets the player know they have won something, but the specific character of the prize is not revealed until a later time. Alternatively, or in addition, the player may be directed to act in a prescribed manner, within a limited time, to fully discover the information to be imparted, or to take advantage of an award.

In some embodiments, time can be made part of the exchange of information by dispensing tangible objects, such as wagering game machine tickets, printed on self-erasing paper, or using e-paper, or a combination of these. Other mechanisms can also be used, including recording the information in miniature, portable memory devices.

For the purposes of this document, the following definitions apply:

e-paper: common paper or some other sheet-like material (e.g., plastic or polymer) that allows the text displayed thereon to be re-written. e-paper may comprise organic electronics and conductive plastic containing tiny balls or reservoirs that respond to an electric charge, changing the textual display in much the same way that pixels change on a computer monitor. This type of e-paper is available from E Ink Corporation of Cambridge, Mass.; Polymer Vision Ltd. of Eindhoven, The Netherlands; and Microcup® electronic paper available from SiPix Imaging, Inc. of Fremont, Calif. e-paper may also comprise a display based on organic electrochemical smart pixels printed on regular paper and other substrates, such as the organic light-emitting diode (OLED) displays produced via ink jet printing at OTB Display of Eindhoven, The Netherlands.

self-erasing format: a printing format in which information is printed so as to be perceived by a human when illuminated by light in the visible spectrum. After some preselected amount of time (e.g. 1 hour, 4 hours, or 48 hours), the information is no longer perceivable to the human, either because it has disappeared, or become obscured.

self-erasing paper: paper that can be printed by exposing it to a sufficient intensity of appropriate wavelengths of light. The printed images can be perceived by humans when illuminated by light in the visible spectrum, but after some preselected length of time, the displayed images disappear, so as not to be perceptible to humans when illuminated by light in the visible spectrum. Examples of printing in a self-erasing format include the use of self-erasing paper developed by the Xerox Palo Alto Research Center in Palo Alto, Calif.

Figure 1:
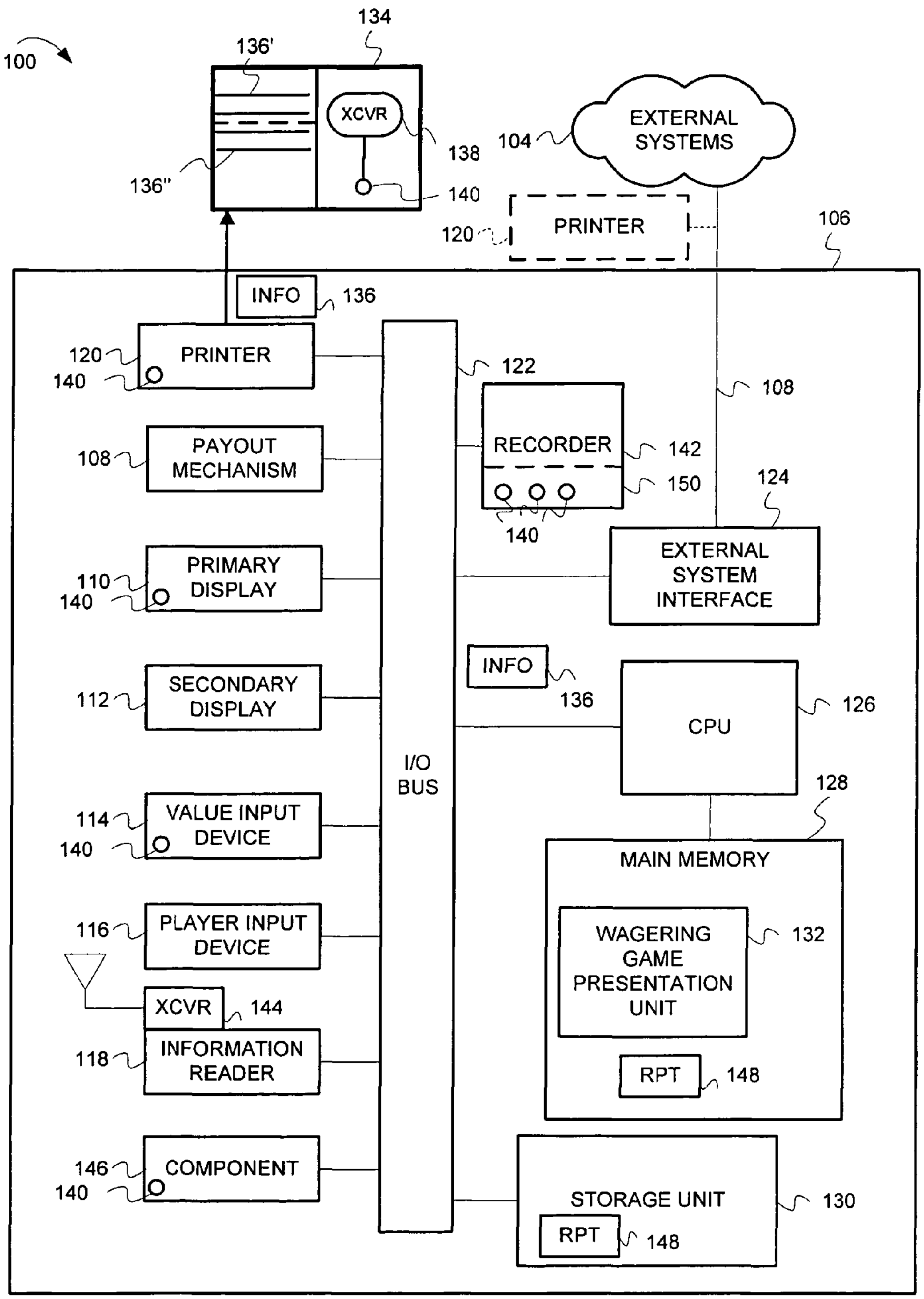
FIG. 1 is a block diagram illustrating a wagering game machine architecture according to example embodiments of the inventive subject matter.

FIG. 1 is a block diagram illustrating a wagering game machine architecture according to example embodiments of the inventive subject matter. As shown in FIG. 1, the wagering game machine 106 includes a central processing unit (CPU) 126 connected to main memory 128, which includes a wagering game presentation unit 132. In some embodiments, the wagering game presentation unit 132 can operate to present wagering games, such as video poker, video black jack, video slots, video lottery, etc., in whole or in part.

The CPU 126 is also connected to an input/output (I/O) bus 122, which facilitates communication between the wagering game machine's components. The I/O bus 122 is connected to a payout mechanism 108, primary display 110, secondary display 112, value input device 114, player input device 116, information reader 118, and storage unit 130. The player input device 116 can include the value input device 114 to the extent the player input device 116 is used to place wagers.

The I/O bus 122 is also connected to a printer 120, a recording device 142, and an external system interface 124 (e.g., comprising a wired or wireless interface device, such as a wireless network transceiver), which in turn may be coupled to external systems 104 (e.g., wagering game networks). Additional components 146, which may be similar to or identical to any of those already described (e.g., payout mechanism 108, displays 110, 112, input devices 114, 116, reader 118, printer 120, interface 124, CPU 126, storage unit 130, recording device 142, etc.), may also be connected to the I/O bus 122.

Thus, in some embodiments, the wagering game machine 106 can include additional peripheral devices and/or more than one of each component shown in FIG. 1. For example, in some embodiments, the wagering game machine 106 can include multiple external system interfaces 124 and multiple CPUs 126. In some embodiments, any of the components 146 can be integrated or subdivided. Additionally, in some embodiments, the components 146 of the wagering game machine 106 can be interconnected according to any suitable interconnection architecture (e.g., directly connected, serially, hypercube, etc.).

In some embodiments, any of the components 146 of the wagering game machine 106 can include hardware, firmware, and/or software for performing any of the operations or methods described herein. Machine-readable media includes any mechanism that provides (e.g., stores and/or transmits) information in a form readable by a machine (e.g., a wagering game machine, computer, etc.). For example, tangible machine-readable media includes read only memory (ROM), random access memory (RAM), magnetic disk storage media, optical storage media, flash memory chips and devices, etc. Machine-readable media also includes any media suitable for transmitting software over a network.

Thus, many embodiments may be realized. For example, a wagering game machine 106 may comprise a processor 126 operable to present a wagering game upon which monetary value may be wagered, and a printer 120 to receive information 136 from the processor 126 and to print the information in human perceivable form on a tangible object 134 in a self-erasing format. The printer 120 may be included in the wagering game machine 106, or coupled to it externally, such as via a network 108, which may comprise a wired network, a wireless network, or some combination of these.

The tangible object 134 in a self-erasing format might comprise common paper printed with disappearing ink, self-erasing paper printed with light waves, or e-paper having a display printed with timed electrical signals, among others. That is, the display may be programmed to display a first part of the information 136' at one time, a second part of the information 136" at another, and so on. Further, the first part of the information 136' may only be available for a first limited time, and the second part of the information 136" might only be available for a second limited time—with the time limits being the same, or different. Thus, a first portion of the information 136' may be designated to disappear after a first selected time, and a second portion of the information 136" may be designated to disappear after a second selected time. The information 136 may be divided into additional portions, and additional corresponding time limits may be employed, as desired.

Additional examples of a tangible object 134 in a self-erasing format might comprise a key, a plastic (credit) card, a wagering game machine ticket, or a smart card including a display to display the information 136, such as those available from Aveso, Inc. of Fridley, Minn.

Memory devices 140 may also be employed in various embodiments. Such devices include the memory spots developed by Hewlett Packard Corporation of Palo Alto, Calif., comprising a memory coupled to an antenna that can be used to store and retrieve information over a wireless link. Some of the devices 140 are passive devices, operating to scavenge power from the surrounding environment, and some of the devices 140 are active devices that include a power supply, such as a battery or solar cell. Some of the devices 140 are coupled to wireless transceivers 138.

These memory devices 140 may be attached, perhaps using adhesive, to the various components 146 of the wagering game machine 106, and used to identify the component type and/or its characteristics, such as the number of operating hours, software revision, type of ink used, amount of consumable remaining, number of times services, permitted and excluded wagering game machine types, and permitted/excluded games, among others. The memory devices 140 may also be attached to tangible objects 134, whether they are located inside or outside the wagering game machine 106. Thus, additional embodiments may be realized.

For example, a wagering game machine may comprise a processor 126 operable to present a wagering game upon which monetary value may be wagered, a printer 120 to receive information 136 from the processor 126 and to print a first portion of the information 136' on a tangible object 134, such as a wagering game machine ticket 134, and a recording device 142 to record a second portion of the information 136" in a memory device 140 coupled to a wireless transceiver 138 to be attached to the tangible object 134. The wireless transceiver 138 may comprise a passive or active radio frequency identification (RFID) circuit, as are well known to those of ordinary skill in the art.

The wagering game machine 106 may further include an attachment mechanism 150 (e.g., press or stamping mechanism) to attach one or more memory devices 140 and the wireless transceiver 138 to the tangible object 134. As noted previously, the tangible object 134, perhaps comprising a wagering game machine ticket, may include self-erasing paper to be printed with light waves, and/or e-paper to receive an image associated with at least one of the first portion of the information 136' or the second portion of the information 136" (e.g., an image of a prize or award).

Other embodiments may be realized. For example, a wagering game machine 106 may comprise a processor 126 operable to present a wagering game upon which monetary value may be wagered, and a reader 118 to read information 136 in a memory device 140 coupled to a wireless transceiver 138 and attached to a removable component 146 of the wagering game machine 106. The information 136 may be specifically associated with the component 146, for example. Thus, the reader 118 may comprise a wireless reader by coupling it to a wireless receiver or transceiver 144 in some embodiments.

The component 146 to which the memory device 140 is attached may comprise any number of devices, including one or more flash cards or flash drives, reel strips, a wagering game machine cover glass, mechanical dice. Indeed, the component 146 may comprise any component part or peripheral associated with the game machine 106, such that the attached memory device 140 (with transceiver 138) can act as a sensor/data transceiver unit.

This configuration of a wagering game machine 106 leads to a variety of potential implementations. For example, the processor 126 may be used to query the reader 118 to determine whether the wagering game machine 106 is properly configured, based on the information 136 obtained from the various memory devices 140 attached to various components 146. The processor 126 may also be used to query the reader 118 and compile a configuration report 148 associated with the wagering game machine 106. The configuration report 148 may include boot, peripherals, and setup information associated with the wagering game machine. The configuration report 148 may be recorded to the storage unit 130 and/or a memory device 140 to be attached to a wagering game machine ticket (e.g., the tangible object 134) to be dispensed by wagering game machine 106.

Figure 2:
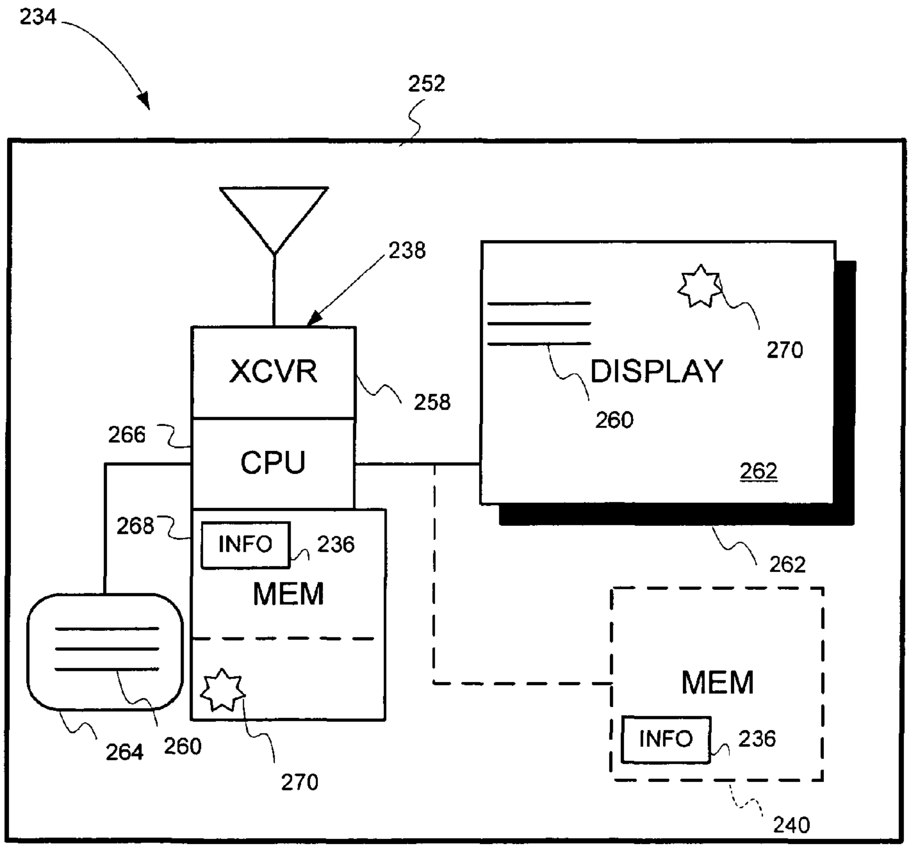
FIG. 2 is a block diagram illustrating a tangible object, such as a wagering game machine ticket, according to example embodiments of the inventive subject matter.

FIG. 2 is a block diagram illustrating a tangible object 234, such as a wagering game machine ticket, according to example embodiments of the inventive subject matter. Thus, some embodiments may include a tangible object 234 (e.g., a ticket or other object, similar to or identical to the object 134 of FIG. 1) comprising a wagering game machine ticket 252 that includes a surface 264 and human-perceivable indicia 260 associated with a wagering game rendered in a self-erasable format on the surface 264.

The tangible object 234 may also comprise a memory device 240, similar to or identical to the memory device 140, attached to the object 234, and a wireless transceiver 258 coupled to the memory device 240 and attached to the object 234. The memory device 240 may be used to exchange information 236 related to the wagering game with the wireless transceiver 258. The tangible object 234 may be dispensed by a wagering game machine, or some peripheral coupled to the machine or a network of machines, such as a printer or recording device (e.g., see components 120 and 142 in FIG. 1). The wagering game machine ticket 252 may comprise a returned value ticket, such as a ticket that awards some value, monetary or otherwise, returned to the player.

In some embodiments, the memory device 240 and the wireless transceiver 258 are formed on a single die, and the die may be adhesively attached to the tangible object 234. The wireless transceiver 258 may comprise a radio frequency transceiver (e.g., RFID transceiver), a light-wave transceiver, an infra-red transceiver, or a combination of these.

A processor 266 may be included in the tangible object 234, and used to access a memory 268 that can be used to store program instructions, images 270, and information 236. Thus, the tangible object 234 may include a display 262, perhaps comprising e-paper, to receive one or more images 270 associated with at the indicia 260 or the information 236. Of course, the images 270 need not be associated with the indicia 260 or information 236. For example, the images 270 may be related to a particular wagering game that has just been played, an award, or the player of the game.

Figure 3:
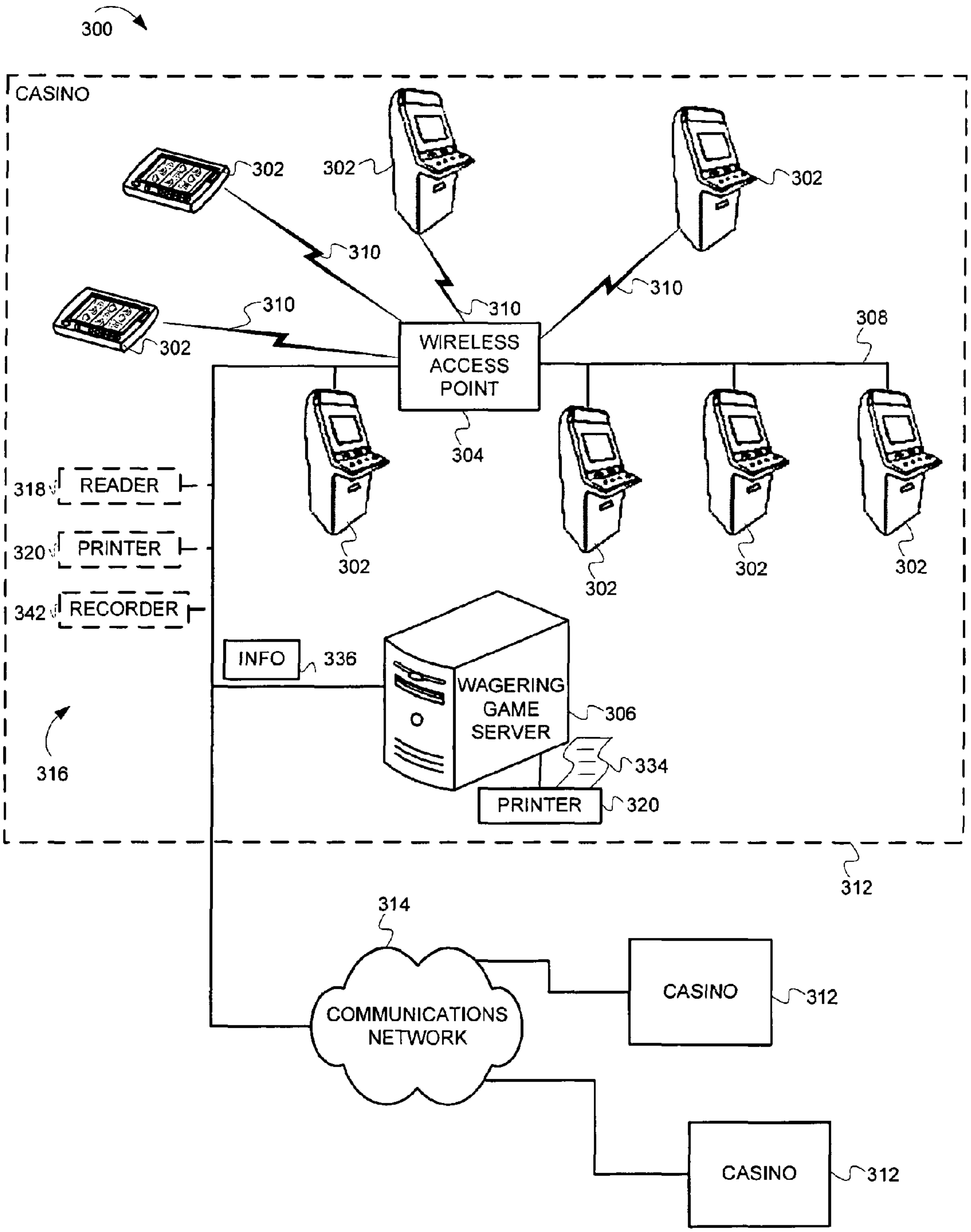
FIG. 3 is a block diagram illustrating a wagering game network and system according to example embodiments of the inventive subject matter.

While FIG. 1 (and later, FIG. 8) describe example embodiments of a wagering game machine architecture and FIG. 2 describes a tangible object that can be used to exchange wagering game information, FIG. 3 shows how a plurality of wagering game machines can be connected in a wagering game network.

Example Wagering Game Network

FIG. 3 is a block diagram illustrating a wagering game network and system 300 according to example embodiments of the inventive subject matter. As shown in FIG. 3, the wagering game system 300 includes a plurality of casinos 312 connected to a communications network 314.

Each of the plurality of casinos 312 includes a local area network 316, which may include a wireless access point 304, wagering game machines 302, and a wagering game server 306 that can serve wagering games over the local area network 316. As such, the local area network 316 includes wireless communication links 310 and wired communication links 308. The wired and wireless communication links can employ any suitable connection technology, such as Bluetooth, 802.11, Ethernet, public switched telephone networks, SONET, etc. In some embodiments, the wagering game server 306 can serve wagering games and/or distribute content to devices located in other casinos 312 or at other locations on the communications network 314. The wagering game machines 302 and wagering game server 306 can include hardware and machine-readable media including instructions for performing the operations described herein.

The wagering game machines 302 described herein can take any suitable form, such as floor standing models, portable units, handheld mobile units, bartop models, workstation-type console models, etc. Further, the wagering game machines 302 can be primarily dedicated for use in conducting wagering games, or can include non-dedicated devices, such as mobile phones, personal digital assistants, personal computers, etc. In some embodiments, the wagering game system 300 can include other network devices, such as accounting servers, wide area progressive servers, player tracking servers, and/or other devices suitable for use in connection with embodiments of the invention. In any embodiment, the wagering game machines 302 may be similar to or identical to the wagering game machine 106 of FIG. 1.

In various embodiments, wagering game machines 302 and wagering game servers 306 work together such that a wagering game machine 302 may be operated as a thin, thick, or intermediate client. For example, one or more elements of game play may be controlled by the wagering game machine 302 (client) or the wagering game server 306 (server). Game play elements may include executable game code, lookup tables, configuration files, game outcome, audio or visual representations of the game, game assets or the like.

In a thin-client example, the wagering game server 306 may perform functions such as determining game outcome or managing assets, while the wagering game machine 302 may be used merely to present the graphical representation of such outcome or asset modification to the user (e.g., player). In a thick-client example, game outcome may be determined locally (e.g., at the wagering game machine 302) and then communicated to the wagering game server 306 for recording or managing a player's account. Game outcomes, credits, awards, and other information 336 may be exchanged by communicating it to players via tangible objects 334 dispensed by printers 320 and/or recorders 342 coupled to the machines 302, servers 306, or the network 316. Information 336 may be received from the players using the tangible objects 334, perhaps acquired via readers 318 coupled to the machines 302, servers 306, or the network 316.

Functionality not directly related to game play may be controlled by the wagering game machine 302 (client) or the wagering game server 306 (server) in various embodiments. For example, power conservation controls that manage a display screen's light intensity may be managed centrally (e.g., by the wagering game server 306) or locally (e.g., by the wagering game machine 302). Other functionality not directly related to game play may include presentation of advertising, software or firmware updates, system quality or security checks, etc.

Example Wireless Environment

In some embodiments, the wireless access point 304 can be part of a communication station, such as wireless local area network (WLAN) communication station including a Wireless Fidelity (WiFi) communication station, or a WLAN access point (AP). In these embodiments, the wagering game machines 302 can be part of a mobile station, such as WLAN mobile station or a WiFi mobile station.

In some other embodiments, the wireless access point 304 can be part of a broadband wireless access (BWA) network communication station, such as a Worldwide Interoperability for Microwave Access (WiMax) communication station, as the wireless access point 304 can be part of almost any wireless communication device. In these embodiments, the wagering game machines 302 can be part of a BWA network communication station, such as a WiMax communication station.

In some embodiments, any of the wagering game machines 302 can be part of a portable wireless communication device, such as a personal digital assistant (PDA), a laptop or portable computer with wireless communication capability, a web tablet, a wireless telephone, a wireless headset, a pager, an instant messaging device, a digital camera, a television, a medical device (e.g., a heart rate monitor, a blood pressure monitor, etc.), or other device that can receive and/or transmit information wirelessly.

In some embodiments, the wireless access point 304 and the wagering game machines 302 can communicate RF signals in accordance with specific communication standards, such as the Institute of Electrical and Electronics Engineers (IEEE) standards including IEEE 802.11(a), 802.11(b), 802.11(g), 802.11(h) and/or 802.11(n) standards and/or proposed specifications for wireless local area networks, but they can also be suitable to transmit and/or receive communications in accordance with other techniques and standards. In some BWA network embodiments, the wireless access point 304 and the wagering game machines 302 can communicate RF signals in accordance with the IEEE 802.16-2004 and the IEEE 802.16(e) standards for wireless metropolitan area networks (WMANs) including variations and evolutions thereof. However, they can also be suitable for transmitting and/or receiving communications in accordance with other techniques and standards. For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," Can 2005 and related amendments/versions.

In some embodiments, the wireless access point 304 and the wagering game machines 302 can communicate in accordance with standards such as the Pan-European mobile system standard referred to as the Global System for Mobile Communications (GSM). In some embodiments, the wireless access point 304 and the wagering game machines 302 can also communicate in accordance with packet radio services such as the General Packet Radio Service (GPRS) packet data communication service. In some embodiments, the wireless access point 304 and the wagering game machines 302 can communicate in accordance with the Universal Mobile Telephone System (UMTS) for the next generation of GSM, which can, for example, implement communication techniques in accordance with 2.5 G and third generation (3 G) wireless standards (See 3GPP Technical Specification, Version 3.2.0, March 2000). In some of these embodiments, the wireless access point 304 and the wagering game machines 302 can provide packet data services (PDS) utilizing packet data protocols (PDP). In other embodiments, the wireless access point 304 and the wagering game machines 302 can communicate in accordance with other standards or other air-interfaces including interfaces compatible with the enhanced data for GSM evolution (EDGE) standards (see 3GPP Technical Specification, Version 3.2.0, March 2000).

In other embodiments, the wireless access point 304 and the wagering game machines 302 can communicate in accordance with a short-range wireless standard, such as the Bluetooth™ short-range digital communication protocol. Bluetooth™ wireless technology is a de facto standard, as well as a specification for small-form factor, low-cost, short-range radio links between mobile PCs, mobile phones and other portable devices. (Bluetooth is a trademark owned by Bluetooth SIG, Inc.) In other embodiments, the wireless access point 304 and the wagering game machines 302 can communicate in accordance with an ultra-wideband (UWB) communication technique where a carrier frequency is not used. In other embodiments, the wireless access point 304 and the wagering game machines 302 can communicate in accordance with an analog communication technique. In other embodiments, the wireless access point 304 and the wagering game machines 302 can communicate in accordance with an optical communication technique, such as the Infrared Data Association (IrDA) standard. In some embodiments, the wireless access point 304 and the wagering game machines 302 can communicate in accordance with the Home-RF standard which can be in accordance with a Home-RF Working Group (HRFWG) standard. Some embodiments of the tangible objects (see elements 134, 234, 334 of FIGS. 1, 2, and 3, respectively) may also communicate information 336 wirelessly with the server 306, machines 302, and/or the network 316 via a transceiver attached to a tangible object 334 (as described above).

It should be noted that the reader 318, printers 320, tangible objects 334, information 336, and recorder 342 may be similar to or identical to the reader 118, printers 120, tangible objects 134, information 136, and recorder 142 of FIG. 1. Thus, many additional embodiments may be realized.

For example, a wagering game machine system 300 may comprise a server 306, a client wagering game machine 302 to communicate with the server 306 and comprising a processor operable to present a wagering game upon which monetary value may be wagered. The client wagering game machines 302 may comprise portable wagering game machines.

The system 300 may also comprise one or more printers 320 to receive information 336 from the server 306 or the processor (within the wagering game machines 302), and the printers 320 can be used to print all, or some portion of the information 336 on a tangible object 334 (e.g., a wagering game machine ticket), perhaps in a self-erasing format. The server 306 can communicate with the client wagering game machines 302 via a wired network or a wireless network, or both, and the printers 320 may be configured to operate as a peripheral of the server 306 or the client wagering game machines 302, or both.

In some embodiments, a server 306 may be coupled to a reader 318 to read a memory device (see elements 140 and 240 of FIGS. 1 and 2, respectively) using wireless communication. Alternatively, or in addition, the client wagering game machine 302 may comprise a reader 318 to read the memory device using wireless communication.

The system 300 may also include one or more recording devices 342 to record all, or a portion, of the information 336 in a memory device coupled to a wireless transceiver to be attached to the wagering game machine ticket. The recording device 342 may also be configured to operate as a peripheral of the server 306 or the client wagering game machine 302, or both.

A variety of information 336 may be recorded. For example, the recording device 342 may be used to record financial information as part of the information 336. Thus, the server 306 may be used to read financial information as part of the information 336 from the memory device into an account database (not shown, but coupled to the network, 316, or perhaps maintained within the server 306). Similarly, the client wagering game machine 302 may also be used to read financial information as part of the information 336 from the memory device into an account database.

Example Wagering Game Machines

The following narrative describes two somewhat different wagering game machines, either of which may be used in the various embodiments disclosed herein.

Figure 4:
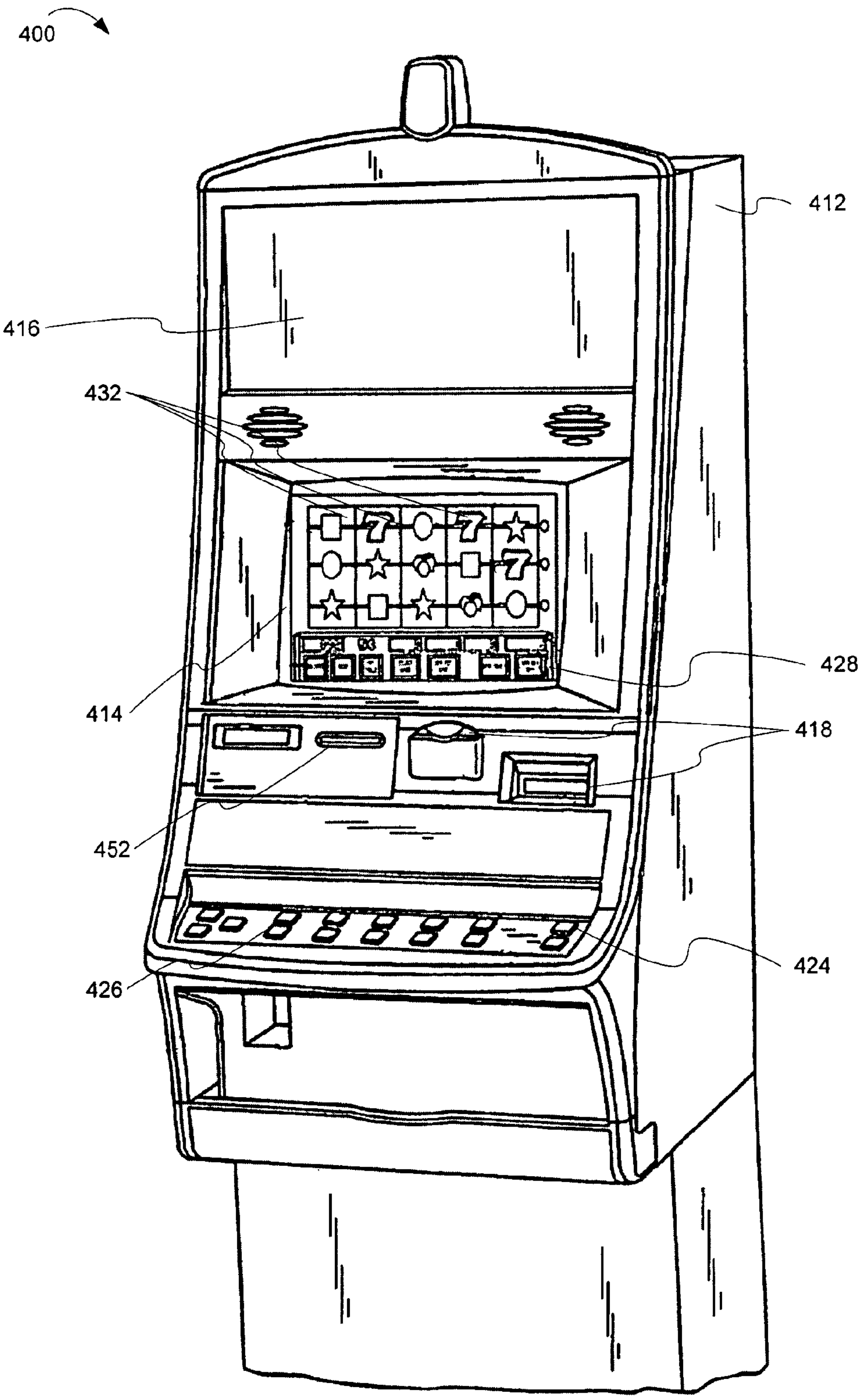
FIG. 4 is a perspective view of a wagering game machine according to example embodiments of the inventive subject matter.

FIG. 4 is a perspective view of a wagering game machine 400 according to example embodiments of the inventive subject matter. The wagering game machine 400, which may be similar to or identical to the machines 106 and 302 of FIGS. 1 and 3, respectively, is used in gaming establishments, such as casinos. According to various embodiments, the wagering game machine 400 can be any type of wagering game machine and can have varying structures and methods of operation. For example, the wagering game machine 400 can be an electromechanical wagering game machine configured to play mechanical slots, or it can be an electronic wagering game machine configured to play video casino games, such as blackjack, slots, keno, poker, blackjack, roulette, etc.

The wagering game machine 400 comprises a housing 412 and may include a variety of input devices, such as value input devices 418 and a player input device 424. For output, the wagering game machine 400 includes a primary display 414 for displaying information about a basic wagering game. The primary display 414 can also display information about a bonus wagering game and a progressive wagering game. The wagering game machine 400 also includes a secondary display 416 for displaying wagering game events, wagering game outcomes, and/or signage information. While some components of the wagering game machine 400 are described herein, numerous other elements can exist and can be used in any number or combination to create varying forms of the wagering game machine 400.

The value input devices 418 can take any suitable form and can be located on the front of the housing 412. The value input devices 418 can receive currency and/or credits inserted by a player. The value input devices 418 can include coin acceptors for receiving coin currency and bill acceptors for receiving paper currency. Furthermore, the value input devices 418 can include ticket readers or barcode scanners for reading information stored on vouchers, cards, or other tangible portable storage devices. The vouchers or cards can authorize access to central accounts, or account databases, which can transfer money to the wagering game machine 400.

The player input device 424 comprises a plurality of push buttons on a button panel 426 for operating the wagering game machine 400. In addition, or alternatively, the player input device 424 can comprise a touch screen 428 mounted over the primary display 414 and/or secondary display 416.

The various components of the wagering game machine 400 can be connected directly to, or contained within, the housing 412. Alternatively, some of the wagering game machine's components can be located outside of the housing 412, while being communicatively coupled with the wagering game machine 400 using any suitable wired or wireless communication technology.

The operation of the basic wagering game can be displayed to the player on the primary display 414. The primary display 414 can also display a bonus game associated with the basic wagering game. The primary display 414 can include a cathode ray tube (CRT), a high resolution liquid crystal display (LCD), a plasma display, light emitting diodes (LEDs), or any other type of display suitable for use in the wagering game machine 400. Alternatively, the primary display 414 can include a number of mechanical reels to display the outcome.

In FIG. 4, the wagering game machine 400 is shown as an "upright" version in which the primary display 414 is oriented vertically relative to the player. Alternatively, the wagering game machine can be a "slant-top" version in which the primary display 414 is slanted at about a thirty-degree angle toward the player of the wagering game machine 400. In yet another embodiment, the wagering game machine 400 can exhibit any suitable form factor, such as a free standing model, bartop model, portable handheld model, or workstation console model.

A player begins playing a basic wagering game by making a wager via the value input device 418. The player can initiate play by using the player input device's buttons or touch screen 428. The basic game can include arranging a plurality of symbols along a payline 432, which indicates one or more outcomes of the basic game. Such outcomes can be randomly selected in response to player input. At least one of the outcomes, which can include any variation or combination of symbols, can trigger a bonus game.

In some embodiments, the wagering game machine 400 can also include an information reader 452, which can include a card reader, ticket reader, bar code scanner, RFID transceiver, or computer readable storage medium interface. In some embodiments, the information reader 452 can be used to award complimentary services, restore game assets, track player habits, etc.

Figure 5:
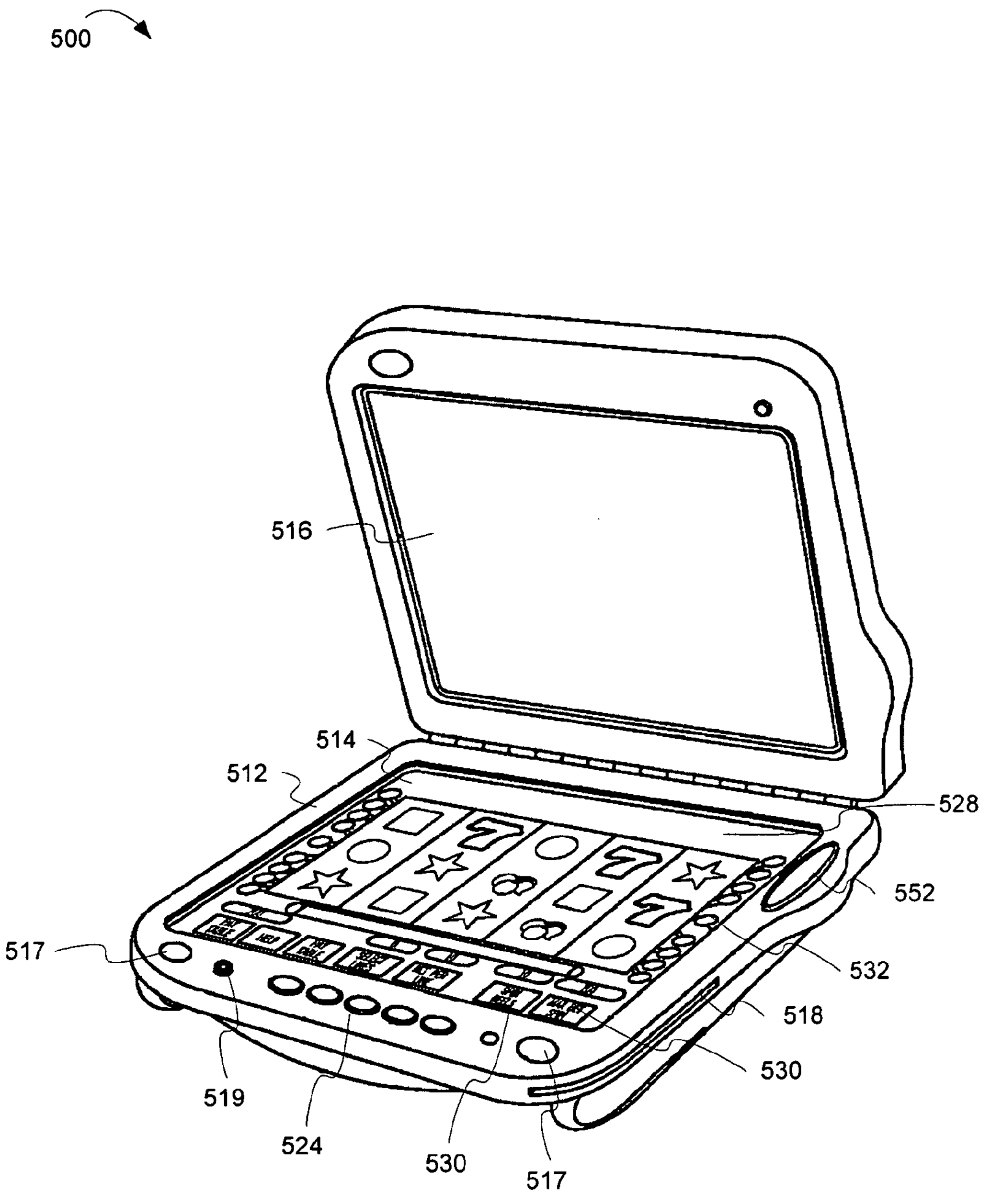
FIG. 5 is a perspective view of a portable wagering game machine according to example embodiments of the inventive subject matter.

FIG. 5 is a perspective view of a portable wagering game machine 500 according to example embodiments of the inventive subject matter. The wagering game machine 500 may be similar to or identical to the machines 106 and 302 of FIGS. 1 and 3, respectively. Like free standing wagering game machines (e.g., shown in FIG. 4), in a handheld or mobile form, the wagering game machine 500 can include any suitable electronic device configured to play a video casino games such as blackjack, slots, keno, poker, blackjack, and roulette.

The wagering game machine 500 comprises a housing 512 and includes input devices, including a value input device 518 and a player input device 524. For output, the wagering game machine 500 includes a primary display 514, a secondary display 516, one or more speakers 517, one or more player-accessible ports 519 (e.g., an audio output jack for headphones, a video headset jack, etc.), and other input/output (I/O) devices and ports, which may or may not be player-accessible. In the embodiment depicted in FIG. 5, the wagering game machine 500 comprises a secondary display 516 that is rotatable relative to the primary display 514. The optional secondary display 516 can be fixed, movable, and/or detachable/attachable relative to the primary display 514. Either the primary display 514 and/or secondary display 516 can be configured to display any aspect of a non-wagering game, wagering game, secondary game, bonus game, progressive wagering game, group game, shared-experience game or event, game event, game outcome, scrolling information, text messaging, emails, alerts or announcements, broadcast information, subscription information, and wagering game machine status.

The player-accessible value input device 518 can comprise, for example, a slot located on the front, side, or top of the housing 512 configured to receive credit from a stored-value card (e.g., casino card, smart card, debit card, credit card, etc.) inserted by a player. The player-accessible value input device 518 can also comprise a sensor (e.g., an RF sensor) configured to sense a signal (e.g., an RF signal) output by a transmitter (e.g., an RF transmitter) carried by a player. The player-accessible value input device 518 can also or alternatively include a ticket reader, or barcode scanner, for reading information stored on a credit ticket, a card, a tangible object, or other tangible portable credit or funds storage device. Such objects can also be used to authorize access to a central account, or account database, which can transfer money to the wagering game machine 500.

Still other player-accessible value input devices 518 can make use of touch keys 530 on the touch-screen display (e.g., primary display 514 and/or secondary display 516) or player input devices 524. Upon entry of player identification information and, preferably, secondary authorization information (e.g., a password, PIN number, stored value card number, predefined key sequences, etc.), the player can be permitted to access a player's account. As an optional security feature, the wagering game machine 500 can be configured to permit a player to only access an account the player has specifically set up for the wagering game machine 500. Other conventional security features can also be utilized to prevent unauthorized access to a player's account, to minimize an impact of any unauthorized access to a player's account, or to prevent unauthorized access to any personal information or funds temporarily stored on the wagering game machine 500.

The player-accessible value input device 518 can itself comprise or utilize a biometric player information reader which permits the player to access available funds on a player's account, either alone or in combination with another of the aforementioned player-accessible value input devices 518. In an embodiment wherein the player-accessible value input device 518 comprises a biometric player information reader, transactions such as an input of value to the wagering game machine 500, a transfer of value from one player account or source to an account associated with the wagering game machine 500, or the execution of another transaction, for example, could all be authorized by a biometric reading, which could comprise a plurality of biometric readings, from the biometric device.

Alternatively, to enhance security, a transaction can be optionally enabled only by a two-step process in which a secondary source confirms the identity indicated by a primary source. For example, a player-accessible value input device 518 comprising a biometric player information reader can require a confirmatory entry from another biometric player information reader 552, or from another source, such as a tangible object, including a credit card, debit card, player ID card, fob key, PIN number, password, hotel room key, etc. Thus, a transaction can be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 518 can be provided remotely from the wagering game machine 500.

The player input device 524 comprises a plurality of push buttons on a button panel for operating the wagering game machine 500. In addition, or alternatively, the player input device 524 can comprise a touch screen mounted to a primary display 514 and/or secondary display 516. In one aspect, the touch screen is matched to a display screen having one or more selectable touch keys 530 selectable by a user's touching of the associated area of the screen using a finger or a tool, such as a stylus pointer. A player enables a desired function either by touching the touch screen at an appropriate touch key 530 or by pressing an appropriate push button on the button panel. The touch keys 530 can be used to implement the same functions as push buttons. Alternatively, the push buttons 532, can provide inputs for one aspect of the operating the game, while the touch keys 530 can allow for input needed for another aspect of the game. The various components of the wagering game machine 500 can be connected directly to, or contained within, the housing 512, as seen in FIG. 5, or can be located outside the housing 512 and connected to the housing 512 via a variety of wired (tethered) or wireless connection methods. Thus, the wagering game machine 500 can comprise a single unit or a plurality of interconnected (e.g., wireless connections) parts which can be arranged to suit a player's preferences.

The operation of the basic wagering game on the wagering game machine 500 is displayed to the player on the primary display 514. The primary display 514 can also display the bonus game associated with the basic wagering game. The primary display 514 preferably takes the form of a high resolution LCD, a plasma display, an LED display, or any other type of display suitable for use in the wagering game machine 500. The size of the primary display 514 can vary from, for example, about a 2-3" display to a 15" or 17" display. In at least some embodiments, the primary display 514 is a 7"-10" display. In some embodiments, the size of the primary display can be increased. Optionally, coatings or removable films or sheets can be applied to the display to provide desired characteristics (e.g., anti-scratch, anti-glare, bacterially-resistant and anti-microbial films, etc.). In at least some embodiments, the primary display 514 and/or secondary display 516 can have a 16:9 aspect ratio or other aspect ratio (e.g., 4:3). The primary display 514 and/or secondary display 516 can also each have different resolutions, different color schemes, and different aspect ratios.

As with the free standing embodiments a wagering gaming machine, a player begins play of the basic wagering game on the wagering game machine 500 by making a wager (e.g., via the value input device 418 or an assignment of credits stored on the handheld gaming machine via the touch screen keys 530, player input device 524, or buttons 532) on the wagering game machine 500. In some embodiments, the basic game can comprise a plurality of symbols arranged in an array, and includes at least one payline 528 that indicates one or more outcomes of the basic game. Such outcomes can be randomly selected in response to the wagering input by the player. At least one of the plurality of randomly selected outcomes can be a start-bonus outcome, which can include any variations of symbols or symbol combinations triggering a bonus game.

In some embodiments, the player-accessible value input device 518 of the wagering game machine 500 can double as a player information reader 552 that allows for identification of a player by reading a card with information indicating the player's identity (e.g., reading a player's credit card, player ID card, smart card, etc.). The player information reader 552 can alternatively or also comprise a bar code scanner, RFID transceiver or computer readable storage medium interface. In some embodiments, the player information reader 552 comprises a biometric sensing device.

Example Operations

Figure 6:
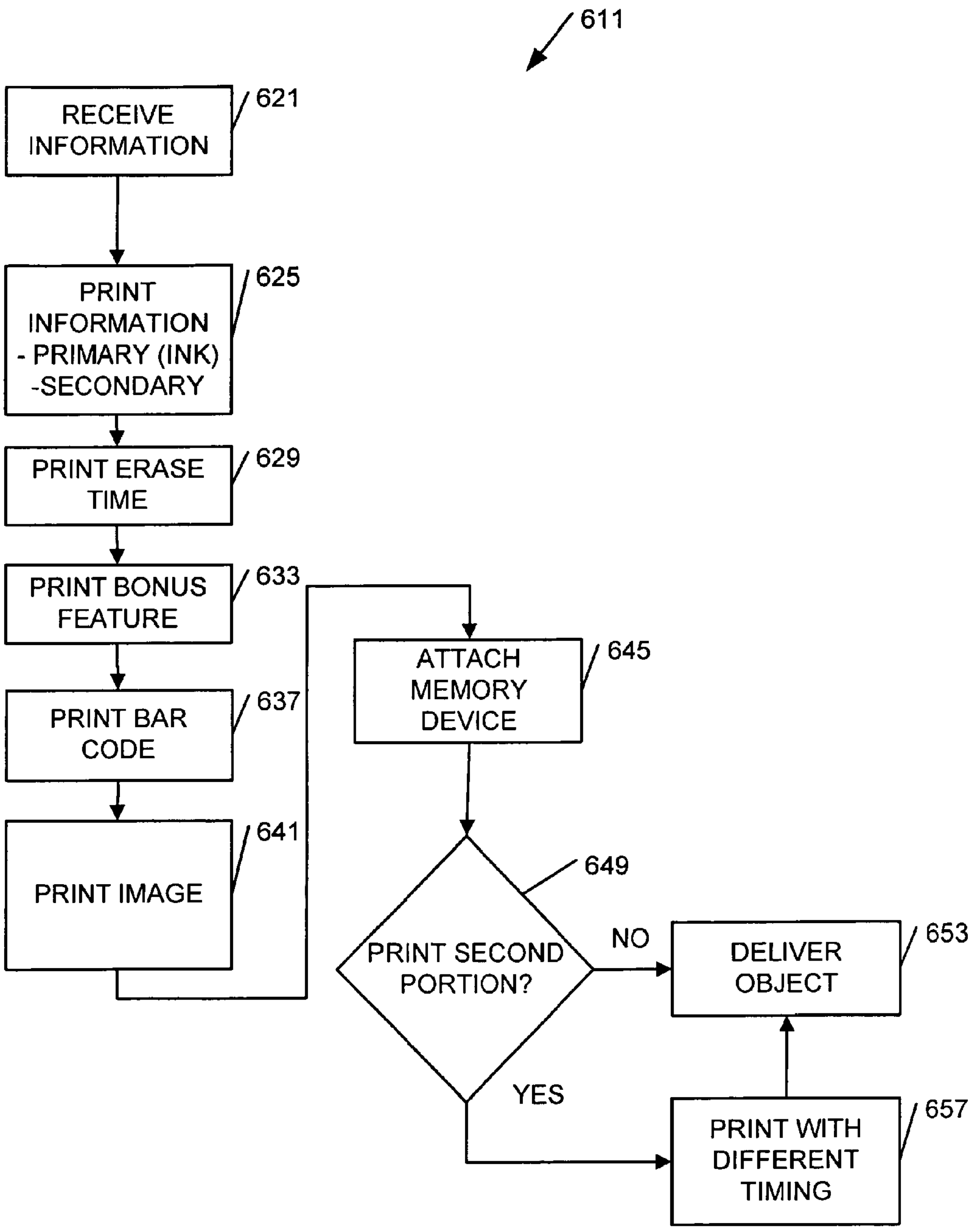
FIG. 6 is a flowchart illustrating methods for transferring information to a tangible object, such as a wagering game machine ticket, according to embodiments of the inventive subject matter.

FIG. 6 is a flowchart illustrating methods 611 for transferring information to a tangible object, such as a wagering game machine ticket, according to embodiments of the inventive subject matter. In some embodiments, a method 611 may (optionally) begin with receiving information associated with a wagering game machine engaged in a process of presenting a wagering game upon which monetary value may be wagered at block 621. The method 611 may continue with printing the information in human perceivable form on a tangible object (e.g., a wagering game machine ticket) in a self-erasing format at block 625.

Many variations are possible. For example, the method 611 may include printing the information as secondary information so as to obscure primary information that becomes perceivable by a human when the secondary information disappears. This may increase player interest as the primary information becomes slowly visible to the player, or visible all at once, after some desired time period. Thus, the primary information may be printed using substantially permanent ink on the tangible object.

In some embodiments, the method 611 includes printing an erasure time associated with the self-erasing format as part of the information at block 629. This may alert the player that the information printed (e.g., an award bonus amount to be redeemed, or a bar code to be scanned) will disappear or expire at, about, or after the indicated time.

Just about any kind of information may be printed. For example, the method 611 may include printing bonus feature access instructions associated with the wagering game as part of the information at block 633 and/or printing a bar code as part of the information at block 637.

Images may also be printed. For example, the method 611 may comprise printing an image associated with the wagering game, perhaps combined with an award, as part of the information at block 641. The image may comprise an image from the game, or an image of the player of the game, or both, or any other image, such as an image associated with an award, monetary or otherwise.

In some embodiments, the method 611 may include attaching a memory device coupled to a wireless transceiver to the tangible object. This activity may occur in parallel with the printing process, in series with it, or completely apart from it.

The method 611 may operate to determine whether the information is to be divided into portions at block 649. If not, then the information, printed on the tangible object, can simply be dispensed or delivered to the player, at block 653.

If the information is to be divided into portions, many more options arise. For example, the method 611 may include, at block 657, printing a first portion of the information to disappear after a first selected time; and printing a second portion of the information to disappear after a second selected time different than the first selected time. Additional possibilities include printing a first portion of the information to disappear after a first selected time, revealing primary information previously obscured by the first portion, and printing a second portion of the information to disappear after a second selected time different than the first selected time, revealing secondary information previously obscured by the second portion, and so on. The tangible object may then be delivered at block 653.

Figure 7:
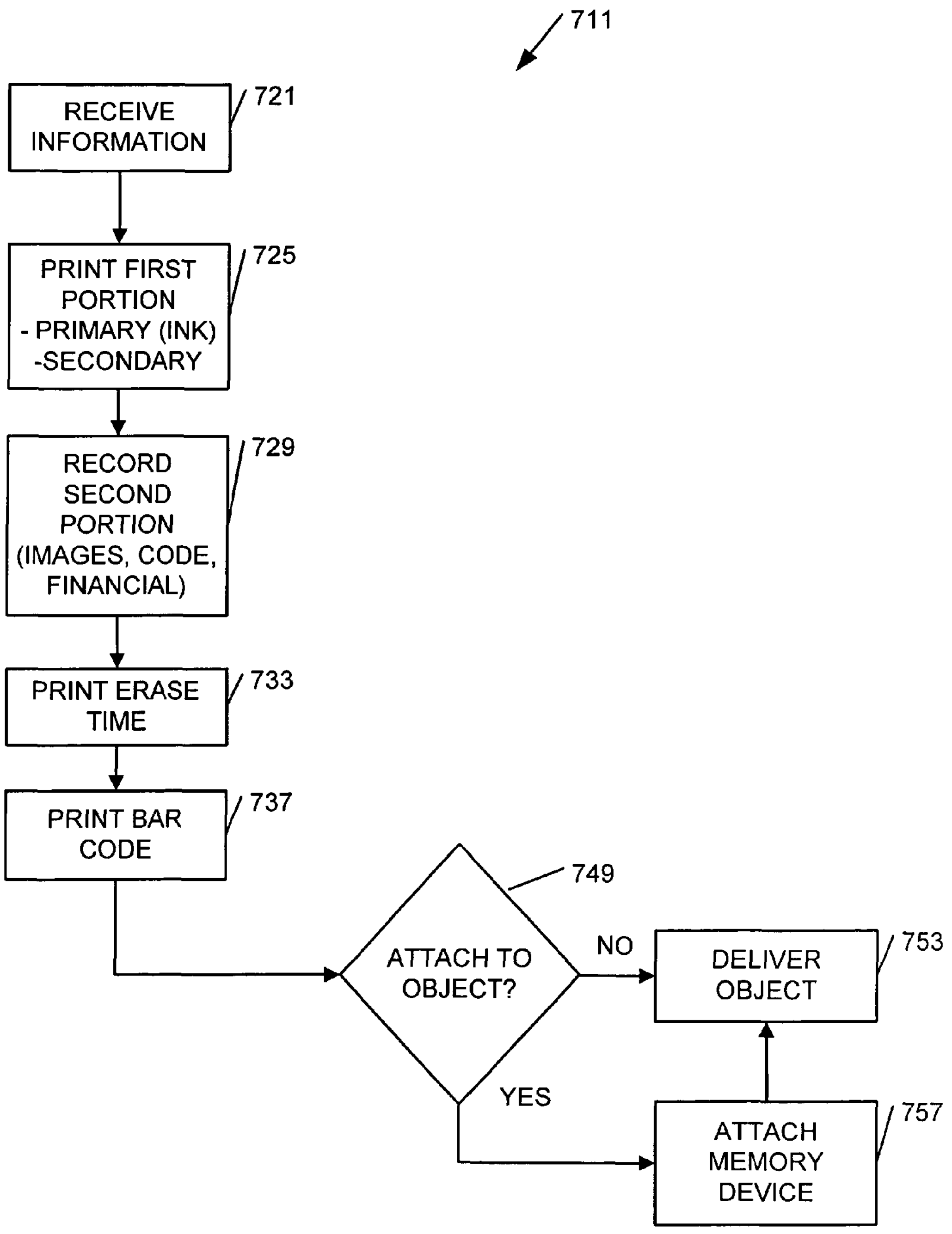
FIG. 7 is a flowchart illustrating additional methods for transferring information to a tangible object, such as a wagering game machine ticket, according to embodiments of the inventive subject matter.

FIG. 7 is a flowchart illustrating additional methods 711 for transferring information to a tangible object, such as a wagering game machine ticket, according to embodiments of the inventive subject matter.

In some embodiments, a method 711 may (optionally) begin with receiving information associated with a wagering game machine engaged in a process of presenting a wagering game upon which monetary value may be wagered at block 721. The method 711 may continue with printing a first portion of the information in human perceivable form on a tangible object (e.g., wagering game machine ticket) at block 725, and recording a second portion of the information in a memory device coupled to a wireless transceiver to be attached to the object at block 729. The method 711 may include printing the first portion to disappear after a selected time, perhaps revealing information previously obscured by the first portion.

Therefore, as noted above, the information may be divided into multiple portions. For example, the first portion and the second portion may be associated with separated, and perhaps sequentially disappearing (or appearing) bonus feature access instructions associated with the wagering game. Thus, the method 711 may comprise printing the first portion of the information as secondary information so as to obscure primary information (e.g., printed in either self-erasing format, or even substantially permanent ink) that becomes perceivable by a human when the secondary information disappears. The method 711 may include printing an erasure time associated with the second portion of the information as part of the first portion of the information, at block 733. The method 711 may also include printing a bar code as part of the first portion, the second portion, or both, at block 737.

Many types of information may be recorded. For example, the method 711 may include recording an image associated with the wagering game or the player, perhaps combined with an award, as part of the second portion. The method 711 may also include recording code for a trial wagering game as part of the second portion (e.g., JAVA code or some other executable file that can be downloaded to a cell phone or other device capable of reading the information stored in the memory device). The method 711 may also include recording a sequence of images (e.g., a movie or slideshow) associated with the wagering game, perhaps combined with an award, as part of the second portion. In some cases, the method 711 may include recording financial information as part of the second portion to enable the wagering game machine ticket to serve as a temporary account card with respect to another wagering game machine, a server, or even an entire casino.

The memory device may be pre-attached to the object (e.g., memory devices, perhaps coupled to wireless transceivers, ready to receive and store the information may be attached with adhesive or embedded within wagering game machine tickets, prior to loading the machine with the tickets). Attachment may also occur within the machine, either before or after printing occurs. Thus, if the memory device does not need to be attached within the machine, as determined at block 749, then the method 711 may continue with simply delivering or dispensing the tangible object at block 753. However, if attachment is desired, then the method 711 may include attaching the memory device (and a wireless transceiver, if desired) to the tangible object at block 757, and then delivering it at block 753. Still further embodiments may be realized.

The methods described herein do not have to be executed in the order described, or in any particular order. Moreover, various activities described with respect to the methods identified herein can be executed in repetitive, serial, or parallel fashion. Information, including parameters, commands, operands, and other data, can be sent and received in the form of one or more carrier waves.

Figure 8:
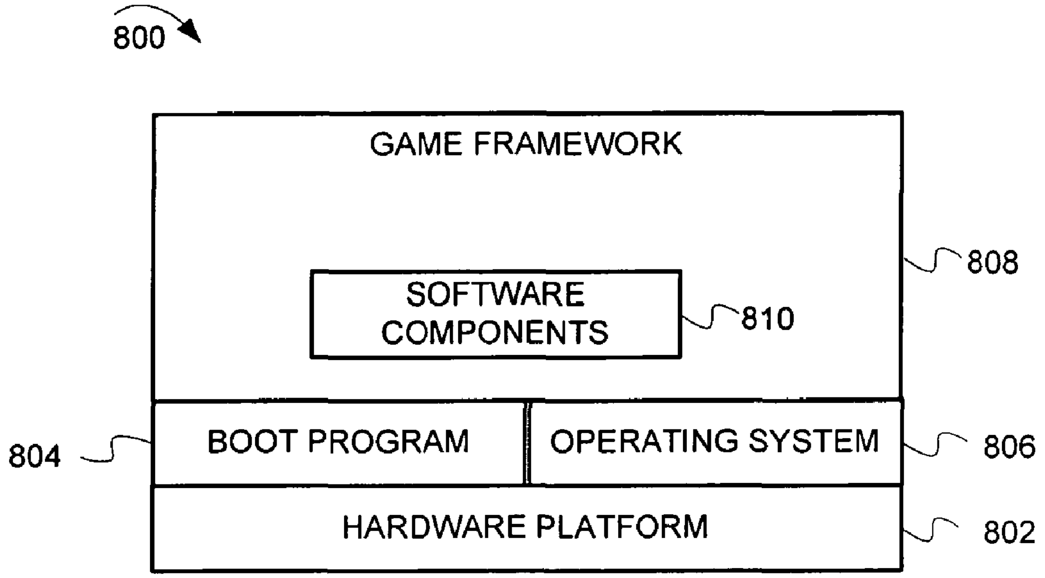
FIG. 8 is a block diagram of an architecture for a wagering game machine.

FIG. 8 is a block diagram of an architecture for a wagering game machine 800, which may be similar to or identical to the wagering game machines 106, 302, 400, 500 of FIGS. 1, 3, 4, and 5, respectively. As shown, the wagering game architecture includes a hardware platform 802, a boot program 804, an operating system 806, and a game framework 808 that includes one or more wagering game software components 810. In various embodiments, the hardware platform 802 may include a thin-client, thick-client, or some intermediate derivation. The hardware platform 802 may also be configured to provide a virtual client. The boot program 804 may include a basic input/output system (BIOS) or other initialization program that works in conjunction with the operation system 806 to provide a software interface to the hardware platform 802.

The game framework 808 may include standardized game software components 810 either independent or in combination with specialized or customized game software components that are designed for a particular wagering game. In one example embodiment, the wagering game software components 810 may include software operative in connection with the hardware platform 802 and operating system 806 to present wagering games, such as video poker, video black jack, video slots, video lottery, etc., in whole or part. According to another example embodiment, the software components 810 may include software operative to accept a wager from a player. According to another example embodiment, one or more of the software components 810 may be provided as part of the operating system 806 or other software used in the wagering game system 200 (e.g., libraries, daemons, common services, etc.). According to one example embodiment, the game software components 810 include one or more components to execute any of the methods described herein.

GENERAL

In this detailed description, reference is made to specific examples by way of drawings and illustrations. These examples are described in sufficient detail to enable those skilled in the art to practice the inventive subject matter, and serve to illustrate how the inventive subject matter can be applied to various purposes or embodiments. Other embodiments are included within the inventive subject matter, as logical, mechanical, electrical, and other changes can be made to the example embodiments described herein. Features or limitations of various embodiments described herein, however essential to the example embodiments in which they are incorporated, do not limit the inventive subject matter as a whole, and any reference to the invention, its elements, operation, and application are not limiting as a whole, but serve only to define these example embodiments.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Description of the Embodiments, it can be seen that various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. Thus the following claims are hereby incorporated into this detailed description, with each claim standing on its own as a separate embodiment.

What is claimed is:

1. A wagering game machine, comprising:

a processor operable to present a wagering game upon which monetary value may be wagered; and a printer to receive information from the processor and to print the information in human perceivable form on a tangible object as printed information in a self-erasing format, wherein the tangible object comprises a wagering game machine ticket, and wherein the printed information is to be printed as portions that disappear at different times so that obscured information can be revealed in a sequence not selected by a player of the wagering game.

2. The wagering game machine of claim 1, wherein the tangible object in the self-erasing format comprises common paper printed with disappearing ink.

3. The wagering game machine of claim 1, wherein the tangible object in the self-erasing format comprises self-erasing paper printed with light waves.

4. The wagering game machine of claim 1, wherein the tangible object in the self-erasing format comprises e-paper having a display printed with timed electrical signals.

5. The wagering game machine of claim 1, wherein the tangible object comprises a smart card including a display to display the information.

6. The wagering game machine of claim 1, wherein the portions comprise a first portion of the printed information that is to disappear after a first selected time, and a second portion of the printed information that is to disappear after a second selected time different than and later than the first selected time.

7. A wagering game machine system, comprising:

a server;

a client wagering game machine to communicate with the server and comprising a processor operable to present a wagering game upon which monetary value may be wagered; and a printer to receive information from at least one of the server or the processor, and to print the information on a tangible object as printed information in a self-erasing format, wherein the tangible object comprises a wagering game machine ticket, and wherein the printed information is to be printed as portions that disappear at different times so that obscured information can be revealed in a sequence not selected by a player of the wagering game.

8. The wagering game machine system of claim 7, wherein the server is to communicate with the client wagering game machine via one of a wired network and a wireless network.

9. The wagering game machine system of claim 7, wherein the printer is configured to operate as a peripheral of at least one of the server or the client wagering game machine.

10. A method, comprising:

receiving information associated with a wagering game machine engaged in a process of presenting a wagering game upon which monetary value may be wagered;

printing the information in human perceivable form on a tangible object as printed information in a self-erasing format, wherein the tangible object comprises a wagering game machine ticket, and wherein the printed information is printed as portions that disappear at different times so that obscured information can be revealed in a sequence not selected by a player of the wagering game.

11. The method of claim 10, comprising:

printing the obscured information using substantially permanent ink on the tangible object.

12. The method of claim 10, comprising:

printing an erasure time associated with the self-erasing format as part of the printed information.

13. The method of claim 10, comprising:

printing bonus feature access instructions associated with the wagering game as part of the obscured information.

14. The method of claim 10, comprising:

printing a bar code as part of the obscured information.

15. The method of claim 10, comprising:

printing an image associated with the wagering game, combined with an award, as part of the obscured information.

16. The method of claim 10, comprising:

attaching a memory device coupled to a wireless transceiver to the tangible object.

17. The method of claim 10, wherein the portions comprise a first portion and a second portion, comprising:

printing the first portion of the printed information to disappear after a first selected time; and printing the second portion of the printed information to disappear after a second selected time different than and later than the first selected time.

* * * * *